US008794900B2

(12) United States Patent
Friggstad et al.

(10) Patent No.: US 8,794,900 B2
(45) Date of Patent: Aug. 5, 2014

(54) POSITION ADJUSTMENT ASSEMBLY FOR AN AGRICULTURAL CONVEYOR

(75) Inventors: Terrance Alan Friggstad, Grasswood (CA); Kevin Norman Hall, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 300 days.

(21) Appl. No.: 13/316,957

(22) Filed: Dec. 12, 2011

(65) Prior Publication Data

US 2013/0149091 A1    Jun. 13, 2013

(51) Int. Cl.
*B65F 1/00*            (2006.01)

(52) U.S. Cl.
USPC .......................................... 414/523; 414/526

(58) Field of Classification Search
USPC ........................... 198/315, 317; 414/503, 572
See application file for complete search history.

(56) References Cited

U.S. PATENT DOCUMENTS

| | | |
|---|---|---|
| 1,485,849 A | 3/1924 | Hartley et al. |
| 2,293,486 A | 8/1942 | Barrett |
| 2,856,062 A | 10/1958 | Kling |
| 3,269,563 A | 8/1966 | Spinrad et al. |
| 3,297,148 A | 1/1967 | Andrews |
| 4,975,016 A | 12/1990 | Pellenc et al. |
| 5,044,484 A | 9/1991 | Douglas |
| 5,443,351 A | 8/1995 | Pettijohn |
| 5,529,455 A | 6/1996 | Kaster et al. |
| 6,257,343 B1 | 7/2001 | Maenle et al. |
| 7,455,128 B2 | 11/2008 | Belik |
| 7,488,149 B2 | 2/2009 | Waldner |
| 7,500,814 B2 | 3/2009 | Meyer |
| 2005/0238469 A1 * | 10/2005 | Cresswell et al. ............ 414/523 |
| 2009/0110526 A1 | 4/2009 | Kinzenbaw |
| 2010/0290879 A1 | 11/2010 | Ricketts et al. |
| 2013/0149090 A1 * | 6/2013 | Friggstad et al. ............ 414/523 |
| 2013/0149091 A1 * | 6/2013 | Friggstad et al. ............ 414/523 |
| 2013/0180831 A1 * | 7/2013 | Ryder et al. ................. 198/617 |

FOREIGN PATENT DOCUMENTS

CA          2510966          8/2006

OTHER PUBLICATIONS

PCT International Search Report and Written Opinion mailed Apr. 18, 2013.
U.S. Appl. No. 13/316,930, filed Dec. 12, 2011, Terrance Alan Friggstad.

* cited by examiner

*Primary Examiner* — Saul Rodriguez
*Assistant Examiner* — Emery Hassan
(74) *Attorney, Agent, or Firm* — Rebecca L. Henkel

(57) ABSTRACT

A position adjustment assembly for an agricultural conveyor includes an inner arm having a first end configured to rotatably couple to an agricultural storage system at a first location. The position adjustment assembly also includes an outer arm having a first end, a second end, and a pivot positioned between the first end and the second end. A second end of the inner arm is rotatably coupled to the outer arm at the pivot, and the agricultural conveyor is configured to rotatably couple to the second end of the outer arm. In addition, the position adjustment assembly includes an intermediate link having a first end configured to rotatably couple to the agricultural storage system at a second location, longitudinally offset from the first location. A second end of the intermediate link is rotatably coupled to the first end of the outer arm.

19 Claims, 6 Drawing Sheets

POSITION ADJUSTMENT ASSEMBLY FOR AN AGRICULTURAL CONVEYOR

BACKGROUND

The invention relates generally to agricultural systems and, more particularly, to a position adjustment assembly for an agricultural conveyor.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver agricultural product (e.g., seeds, fertilizer, etc.) to ground engaging tools within the seeding implement. Certain air carts include a metering system and an air conveyance system configured to deliver metered quantities of product into an airflow that transfers the product to the openers. Air carts may also include a product conveying system for moving product from an external source (e.g., a truck, a storage container, etc.) into the air cart. The product conveying system may include a hopper for receiving the product, and a conveyor for moving the product from the hopper to a storage tank in the air cart. Certain air carts include multiple storage compartments having independent openings for receiving product. In such configurations, a guide tube of the conveyor may be successively aligned with each opening to facilitate product flow into the respective storage compartment. In certain embodiments, the conveyor may be coupled to the air cart by an inner arm and an outer arm. Each arm may include an independent actuating cylinder configured to adjust a position of the respective arm relative to the air cart. Unfortunately, coordinating movement of the inner and outer arms to align the guide tube with each storage compartment opening may be difficult and time-consuming, thereby increasing the duration associated with loading product into the air cart.

BRIEF DESCRIPTION

In one embodiment, a position adjustment assembly for an agricultural conveyor includes an inner arm having a first end configured to rotatably couple to an agricultural storage system at a first location. The position adjustment assembly also includes an outer arm having a first end, a second end, and a pivot positioned between the first end and the second end. A second end of the inner arm is rotatably coupled to the outer arm at the pivot, and the agricultural conveyor is configured to rotatably couple to the second end of the outer arm. In addition, the position adjustment assembly includes an intermediate link having a first end configured to rotatably couple to the agricultural storage system at a second location, longitudinally offset from the first location. A second end of the intermediate link is rotatably coupled to the first end of the outer arm.

In another embodiment, a position adjustment assembly for an agricultural conveyor includes an inner arm configured to rotatably couple to an agricultural storage system, and an outer arm having a first end, a second end, and a pivot positioned between the first end and the second end. The inner arm is rotatably coupled to the outer arm at the pivot, and the agricultural conveyor is configured to rotatably couple to the second end of the outer arm. The position adjustment assembly also includes an intermediate link rotatably coupled to the first end of the outer arm, and configured to rotatably couple to the agricultural storage system. The position adjustment assembly is configured to move the second end of the outer arm in a longitudinal direction relative to the agricultural storage system, and to maintain the second end of the outer arm at a substantially constant lateral distance from the agricultural storage system upon rotation of the inner arm relative to the agricultural storage system.

In a further embodiment, a position adjustment assembly for an agricultural conveyor includes an inner arm configured to rotatably couple to an agricultural storage system, and an outer arm having a first end, a second end, and a pivot positioned between the first end and the second end. The inner arm is rotatably coupled to the outer arm at the pivot, and the agricultural conveyor is configured to rotatably couple to the second end of the outer arm. The position adjustment assembly also includes an intermediate link rotatably coupled to the first end of the outer arm, and configured to rotatably couple to the agricultural storage system. The intermediate link is configured to drive the outer arm to rotate about the pivot in a first direction upon rotation of the inner arm relative to the agricultural storage system in a second direction, opposite the first direction, such that a lateral distance between the second end of the outer arm and the agricultural storage system remains substantially constant.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
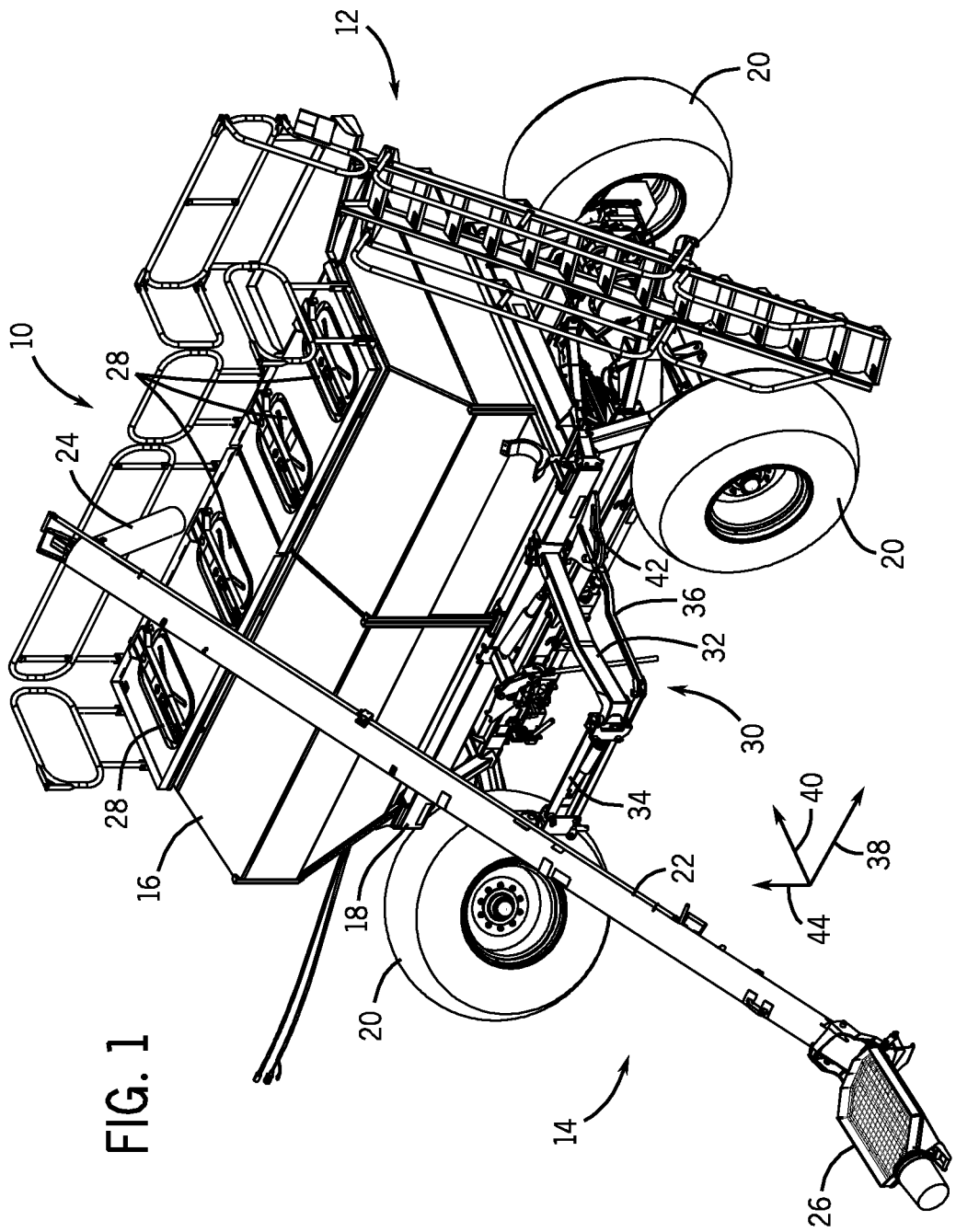
FIG. 1 is a perspective view of an agricultural system including an air cart having a conveyor for moving product.

FIG. 1 is a perspective view of an agricultural system 10 including an agricultural storage system, such as the illustrated air cart 12. In the illustrated embodiment, the agricultural system 10 includes a product conveyor 14 for moving product from an external source to the air cart 12. The air cart 12 includes one or more storage compartments 16 (e.g., holding containers), a frame 18, and wheels 20. The frame 18 includes a towing hitch configured to couple the air cart 12 to an implement or tow vehicle. In certain configurations, the storage compartments 16 may be used for storing various agricultural products. For example, one compartment may include seeds, and another compartment may include a dry fertilizer. In such configurations, the air cart 12 may be configured to deliver both the seeds and the fertilizer to an implement.

In certain embodiments, seeds and/or fertilizer within the storage compartments 16 are gravity fed into metering systems. The metering systems may include meter rollers to regulate the flow of product from the storage compartments 16 into an air flow provided by an air source. The air flow carries the product through one or more hoses or conduits to an implement, thereby supplying ground engaging tools of the implement with seeds and/or fertilizer for deposition into the soil.

In the illustrated embodiment, the product conveyor 14 includes a product transporting tube 22, a guide tube 24 coupled to one end of the product transporting tube 22, and a hopper 26 coupled to the other end of the product transporting tube 22. The conveyor 14 is configured to move agricultural product from the hopper 26, through the product transporting tube 22 and guide tube 24, and into the storage compartments 16. As will be appreciated, the product may be introduced into the hopper 26 from a product transporting vehicle, such as an end-dump truck or a belly-dump truck.

During loading operations, a product transporting vehicle delivers the agricultural product into the hopper 26 (e.g., via an outlet in a bottom portion of a trailer). The hopper 26 then transfers the product to the product transporting tube 22. For example, an auger in the hopper 26 may rotate to move the product to the product transporting tube 22. The product transporting tube 22 may also include an auger configured to receive product from the hopper 26, and to move the product to the guide tube 24, which directs the product into the storage compartments 16. In certain embodiments, the transporting tube auger is coupled to the hopper auger such that rotation of the transporting tube auger drives the hopper auger to rotate. In alternative embodiments, the hopper 26 may include a belt system configured to transfer product from the hopper 26 to the product transporting tube 22. Further, the product transporting tube 22 may include another belt system that interfaces with the belt system of the hopper 26. The transporting tube belt system is configured to move the product from the hopper 26 to the guide tube 24, which directs the product into the storage compartments 16.

In the illustrated embodiment, the air cart 12 includes four storage compartments 16, each having an independent opening 28 for receiving product. In this configuration, the guide tube 24 of the conveyor 14 may be successively aligned with each opening 28 to facilitate product flow into the respective storage compartment 16. To facilitate movement of the conveyor 14 relative to the air cart 12, the agricultural system 10 includes a position adjustment assembly 30. In the illustrated embodiment, the position adjustment assembly 30 includes an inner arm 32, an outer arm 34, and an intermediate link 36. As discussed in detail below, an actuator extending between the frame 18 of the air cart 12 and the inner arm 32 is configured to drive the inner arm 32 to rotate relative to the air cart 12. The intermediate link 36 is configured to induce the outer arm 34 to rotate upon rotation of the inner arm 32 to automatically control a position of a distal end of the outer arm 34. For example, in certain embodiments, the position adjustment assembly 30 is configured to move the distal end of the outer arm 34 along a longitudinal axis 38, while maintaining the distal end at a substantially constant distance from the air cart 12 along a lateral axis 40. In this configuration, the position adjustment assembly 30 may align the guide tube 24 with each successive storage compartment opening 28 via adjustment of a single actuator. As a result, the duration associated with filling the air cart 12 with product may be substantially reduced, as compared to configurations that employ independently controllable inner and outer arms.

In certain embodiments, the position adjustment assembly 30 includes a rotation control assembly 42 configured to induce the intermediate link 36 to drive the outer arm 34 to rotate upon rotation of the inner arm 32. For example, the rotation control assembly 42 may include a cam, and the intermediate link may include a follower configured to engage the cam. In such a configuration, contact between the cam and the follower drives the intermediate link 36 to move along the lateral axis 40 relative to the air cart 12 to facilitate rotation of the outer arm 34. For example, the cam may be shaped such that a lateral distance between the distal end of the outer arm 34 and the air cart 12 remains substantially constant as the distal end is driven to move along the longitudinal axis 38. In further embodiments, the outer arm 34 may include a height adjustment assembly configured to adjust a position of the conveyor 14 along a vertical axis 44 to facilitate alignment of the hopper 26 with the transporting vehicle, and/or to facilitate alignment of the guide tube 24 with the openings 28.

Figure 2:
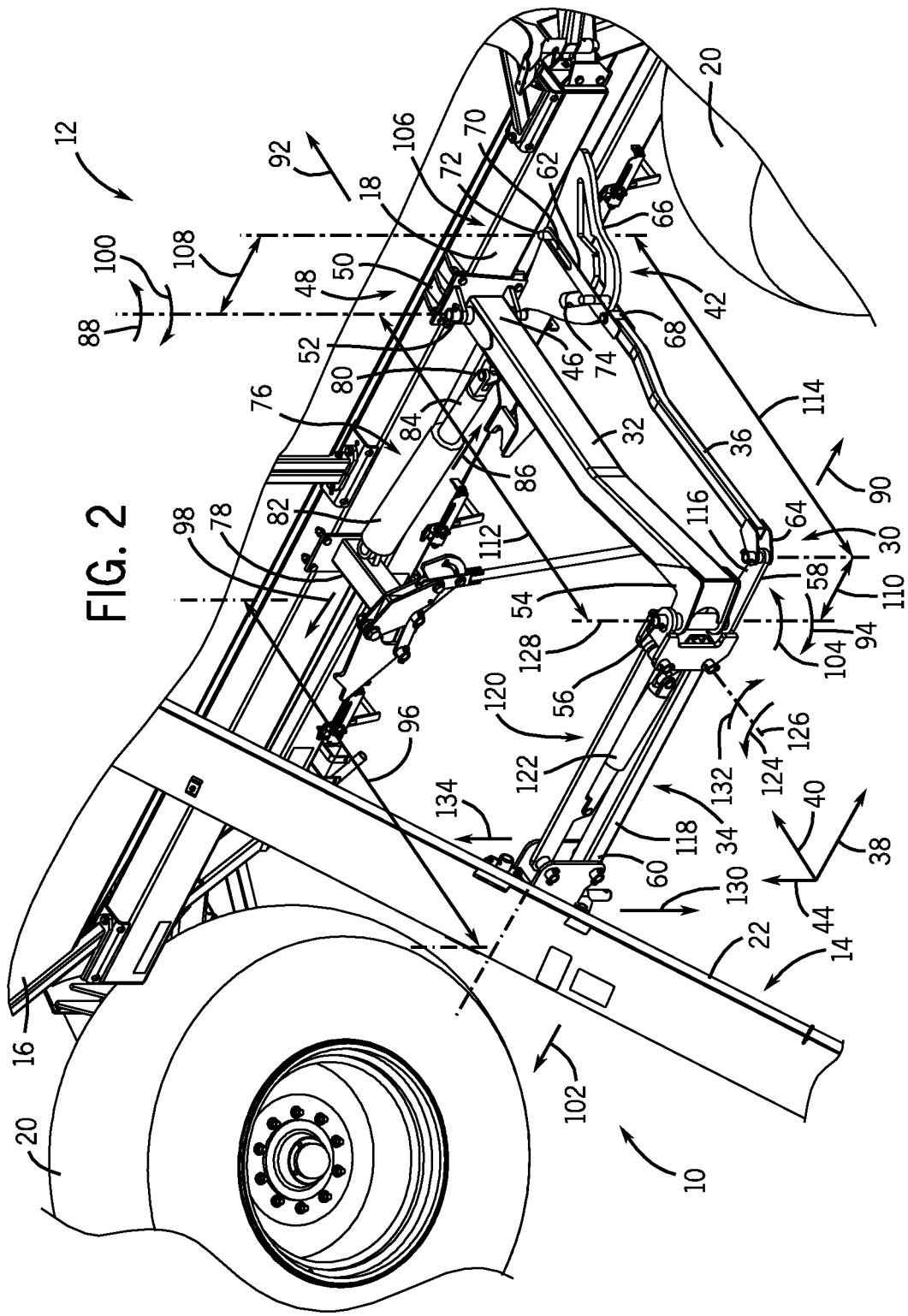
FIG. 2 is a detailed perspective view of an embodiment of a position adjustment assembly that may be employed to adjust a position of a conveyor relative to the air cart of FIG. 1.

FIG. 2 is a detailed perspective view of an embodiment of a position adjustment assembly 30 that may be employed to adjust a position of the conveyor 14 relative to the air cart 12. As previously discussed, the position adjustment assembly 30 is configured to move the conveyor 14 along the longitudinal axis 38 such that the guide tube 24 successively aligns with each storage compartment opening 28. As illustrated, a first end 46 of the inner arm 30 is rotatably coupled to the frame 18 of the air cart 12 at a first location 48. For example, in the illustrated embodiment, the position adjustment assembly 30 includes a mounting bracket 50 secured to the frame 18, and a pivot 52 configured to rotatably couple the first end 46 of the inner arm 32 to the mounting bracket 50. Furthermore, a second end 54 of the inner arm 32 is rotatably coupled to the outer arm 34 by a pivot 56. As illustrated, the pivot 56 is positioned between a first end 58 of the outer arm 34, and a second end 60 of the outer arm 34. The transporting tube 22 of the conveyor 14 is rotatably coupled to the second end 60 of the outer arm 34 to facilitate adjustment of an orientation of the conveyor 14 relative to the air cart 12. In the illustrated embodiment, the conveyor 14 is supported by the inner arm 32 and the outer arm 34, i.e., the arms 32 and 34 are configured to transfer the vertical load of the conveyor 14 to the frame 18 of the air cart 12. The arms 32 and 34 are also configured to facilitate position adjustment of the conveyor 14 relative to the air cart 12.

In the illustrated embodiment, the intermediate link 36 extends between the rotation control assembly 42 and the first end 58 of the outer arm 34. Specifically, a first end 62 of the intermediate link 36 is engaged with the rotation control assembly 42, and a second end 64 of the intermediate link 36 is rotatably coupled to the first end 58 of the outer arm 34. As illustrated, the rotation control assembly 42 includes a cam 66, and the intermediate link 36 includes a follower 68. In this configuration, rotation of the inner arm 32 drives the follower 68 to move along the cam 66, thereby adjusting a lateral position of the first end 62 of the intermediate link 36. As a result, the intermediate link 36 drives the outer arm 34 to rotate about the pivot 56 upon rotation of the inner arm 32. For example, the cam 66 may be shaped such that a lateral distance between the second end 60 of the outer arm 34 and the air cart 12 remains substantially constant as the inner arm 32 rotates. In the illustrated embodiment, the intermediate link 36 includes a slot 70 configured to engage a pin 72 of the rotation control assembly 42, thereby securing the intermediate link 36 to the rotation control assembly 42. In addition, the illustrated rotation control assembly 42 includes a slot 74 configured to receive a pin of the intermediate link 36. In certain embodiments, contact between the pin and the slot 74 induces lateral movement of the intermediate link 36, either alone or in combination with the cam 66 and follower 68.

In the illustrated embodiment, the position adjustment assembly 30 includes a hydraulic cylinder 76 configured to rotate the inner arm 32 relative to the air cart 12. As illustrated, the hydraulic cylinder 76 includes a first end 78 rotatably coupled to the frame 18 of the air cart 12, and a second end 80 rotatably coupled to the inner arm 32. The hydraulic cylinder 76 includes a barrel 82, and a piston rod 84 configured to extend and retract relative to the barrel 82 to drive the inner arm 32 to rotate. While a hydraulic cylinder 76 is utilized in the illustrated embodiment, it should be appreciated that alternative linear actuators (e.g., screw drives, electromechanical actuators, etc.) may be employed in alternative embodiments. In further embodiments, a rotary actuator (e.g., hydraulic, electrical, etc.) may be directly coupled to the pivot 52 to drive the inner arm 32 to rotate.

In the illustrated embodiment, extension of the piston rod 84 in the direction 86 drives the inner arm 32 to rotate in the direction 88. As the inner arm 32 rotates, the second end 54 of the inner arm 32 moves in the direction 90, thereby translating the conveyor 14 along the longitudinal axis 38 in the direction 90. In addition, movement of the second end 54 of the inner arm 32 induces the intermediate link 36 to move in the direction 90, thereby driving the follower 68 along the cam 66. Due to the shape of the cam 66, the first end 62 of the intermediate link 36 is driven to move along the lateral axis 40. For example, movement of the follower 68 away from the apex of the cam 66 induces the first end 62 of the intermediate link 36 to move in the direction 92. As discussed in detail below, movement of the intermediate link 36 in the direction 92 and movement of the outer arm 34 in the direction 90 induces the outer arm 34 to rotate about the pivot 56 in the direction 94. In this configuration, the cam 66 may be shaped such that a lateral distance 96 between the second end 60 of the outer arm 34 and the air cart 12 is precisely controlled. For example, the distance 96 may remain substantially constant as the inner arm 32 rotates in the direction 88. As a result, the conveyor 14 may be positioned to facilitate alignment of the guide tube 24 with each successive storage compartment opening 28 via adjustment of the hydraulic cylinder 76.

Conversely, retraction of the piston rod 84 in the direction 98 drives the inner arm 32 to rotate in the direction 100. As the inner arm 32 rotates, the second end 54 of the inner arm 32 moves in the direction 102, thereby translating the conveyor 14 along the longitudinal axis 38 in the direction 102. In addition, movement of the second end 54 of the inner arm 32 induces the intermediate link 36 to move in the direction 102, thereby driving the follower 68 along the cam 66. Due to the shape of the cam 66, the first end 62 of the intermediate link 36 is driven to move along the lateral axis 40. For example, movement of the follower 68 away from the apex of the cam 66 induces the first end 62 of the intermediate link 36 to move in the direction 92. As discussed in detail below, movement of the intermediate link 36 in the direction 92 and movement of the outer arm 34 in the direction 102 induces the outer arm 34 to rotate about the pivot 56 in the direction 104. In this configuration, the cam 66 may be shaped such that the lateral distance 96 between the second end 60 of the outer arm 34 and the air cart 12 is precisely controlled. For example, the distance 96 may remain substantially constant as the inner arm 32 rotates in the direction 100. As a result, the conveyor 14 may be positioned to facilitate alignment of the guide tube 24 with each successive storage compartment opening 28 via adjustment of the hydraulic cylinder 76.

Because the illustrated position adjustment assembly 30 employs a single actuator to adjust the position of the conveyor 14, the process of moving the conveyor between successive storage compartments may be substantially simplified, as compared to configurations that employ independently controllable conveyor support arms. For example, certain position adjustment assemblies may include a first actuator to control a position of the inner arm, and a second actuator configured to control a position of the outer arm. In such configurations, coordinating movement of the inner and outer arms to align the guide tube with successive storage compartment openings may be difficult and time-consuming, thereby increasing the duration associated with loading product into the air cart. In contrast, the illustrated position adjustment assembly 30 is configured to move the conveyor 14 along the longitudinal axis 38, while maintaining a substantially constant distance 96 between the second end 60 of the outer arm 34 and the air cart 12, via adjustment of a single actuator. As a result, the duration associated with delivering product to the air cart 12 may be substantially reduced.

In alternative embodiments, the intermediate link 36 may be rotatably coupled directly to the frame 18 of the air cart 18, or to a support coupled to the mounting bracket 50. For example, in certain embodiments, the first end 62 of the intermediate link 36 is rotatably coupled to the air cart 12 at a second location 106, longitudinally offset from the first location 48. In this configuration, the intermediate link 36 drives the outer arm 34 to rotate about the pivot 56 in a first direction (e.g., the direction 94) upon rotation of the inner arm 32 in a second direction (e.g., the direction 88), opposite the first direction, such that the lateral distance 96 between the second end 60 of the outer arm 34 and the air cart 12 remains substantially constant. However, it should be appreciated that embodiments employing the rotation control assembly 42 may provide enhanced control of the conveyor 14 because the contour of the cam 66 may be particularly selected to achieve a desired relationship between rotation of the inner arm 32 and position of the second end 60 of the outer arm 34.

Furthermore, it should be appreciated that the geometry of the position adjustment assembly components may be particularly selected to establish a desired relationship between rotation of the inner arm 32 and position of the second end 60 of the outer arm 34. For example, in certain embodiments, a distance 108 between the first location 48 (i.e., the longitudinal position of the mounting bracket 50) and the second location 106 (e.g., the longitudinal position of the apex of the cam 66) may be substantially equal to a distance 110 between the first end 58 of the outer arm 34 and the pivot 56. In addition, a length 112 of the inner arm 32 may be substantially equal to a length 114 of the intermediate link 36. However, it should be appreciated that the lengths 112 and 114, and the distances 108 and 110 may be particularly adjusted to establish a desired relationship between rotation of the inner arm 32 and position of the second end 60 of the outer arm 34. For example, the geometry of the position adjustment assembly 30 may be configured to maintain the second end 60 of the outer arm 34 at a substantially constant lateral distance 96 from the air cart 12 upon rotation of the inner arm 32 relative to the air cart 12.

In the illustrated embodiment, the outer arm 34 is configured to adjust a height of the conveyor 14 relative to the air cart 12. As illustrated, the outer arm 34 includes a first member 116 extending between the first end 58 and the pivot 56. The outer arm 34 also includes a second member 118 rotatably coupled to the first member 116 adjacent to the pivot 56, and extending to the second end 60 of the outer arm 34. In the illustrated embodiment, the second member 118 is an element of a parallel linkage assembly 120 extending between the pivot 56 and the second end 60 of the outer arm 34. However, it should be appreciated that a single member may extend between the pivot 56 and the second end 60 in alternative embodiments. As illustrated, an actuator 122 is coupled to the parallel linkage assembly 120, and configured to adjust a height of the conveyor 14. For example, the actuator 122 may rotate the second member 118 in a downward direction 124 about an axis 126 substantially perpendicular to a rotational axis 128 of the pivot 56, thereby inducing the conveyor 14 to move in a downward direction 130 along the vertical axis 44. Conversely, the actuator 122 may rotate the second member 118 in a upward direction 132, thereby driving the conveyor 14 to move in an upward direction 134 along the vertical axis 44. In this manner, the height of the conveyor 14 may be particularly adjusted to facilitate alignment between the guide tube 24 and the storage compartment openings 28.

Figure 3:
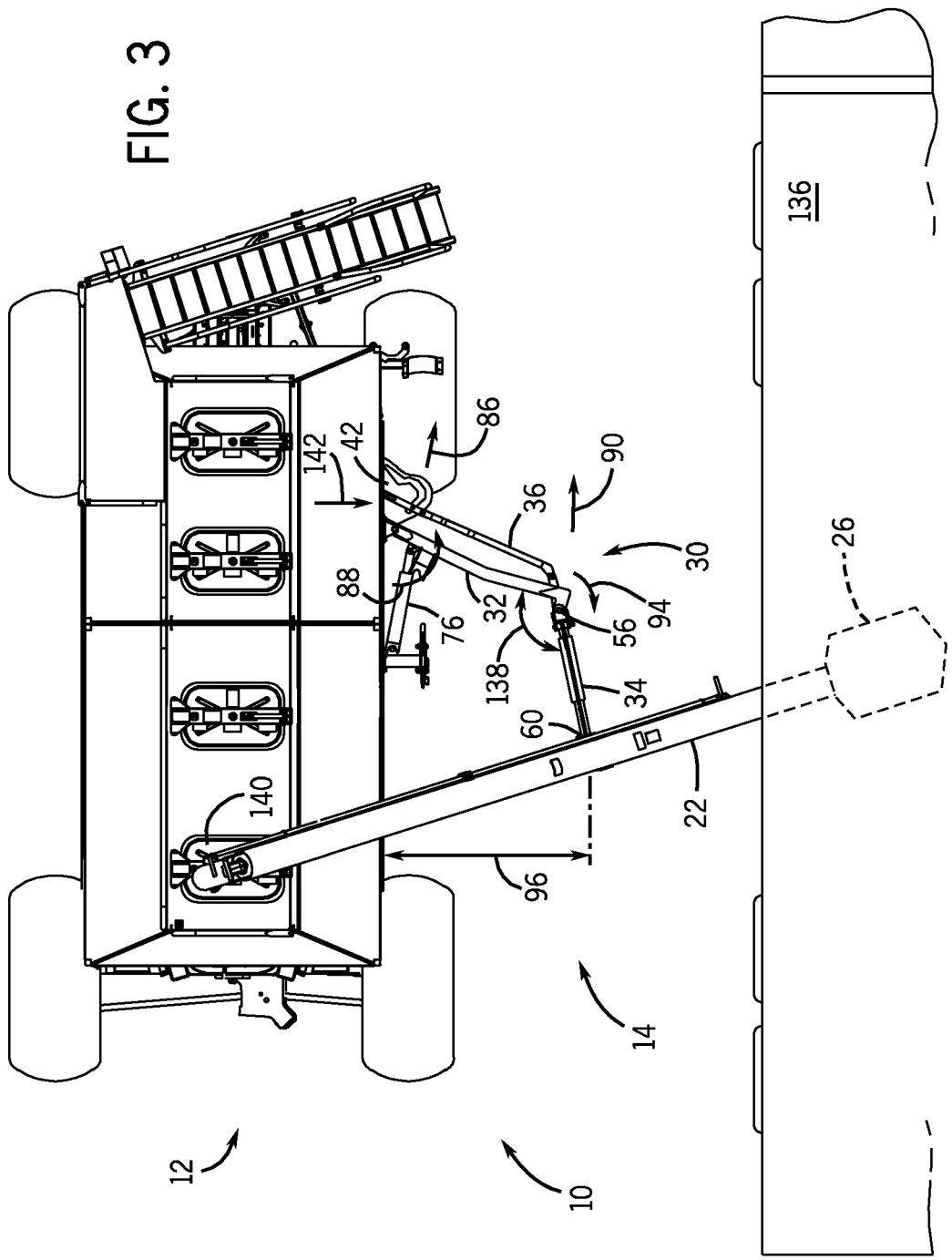
FIG. 3 is a top view of the position adjustment assembly of FIG. 2, in which the conveyor is aligned with a first storage compartment opening.

FIG. 3 is a top view of the position adjustment assembly 30, in which the conveyor 14 is aligned with a first storage compartment opening. In the illustrated embodiment, a belly-dump truck 136 is positioned adjacent to the air cart 12, thereby enabling the conveyor 14 to transfer product from the truck 136 to the air cart 12. As illustrated, the hydraulic cylinder 76 is in a substantially retracted position, thereby establishing an angle 138 between the inner arm 32 and the outer arm 34. Due to the geometry of the position adjustment assembly components, the second end 60 of the outer arm 34 is positioned to facilitate alignment of the conveyor 14 with a first storage compartment opening 140. In addition, the hopper 26 is aligned with an outlet of the truck 136. Consequently, product may flow from the truck outlet to the hopper 26, through the transporting tube 22, and into the first storage compartment opening 140.

Once a desired quantity of product has been delivered to the first storage compartment, the conveyor 14 may be aligned with a successive storage compartment opening. For example, extension of the hydraulic cylinder 76 in the direction 86 drives the inner arm 32 to rotate in the direction 88. As the inner arm 32 rotates, the outer arm 34, the conveyor 14 and the intermediate link 36 are driven in the direction 90. Due to the shape of the rotation control assembly 42, movement of the intermediate link 36 in the direction 90 induces lateral movement of the intermediate link 36 in the direction 142, thereby driving the outer arm 34 to rotate about the pivot 56 in the direction 94. As a result, a distance 96 between the second end 60 of the outer arm 34 and the air cart 12 remains substantially constant as the inner arm 32 rotates in the direction 88. Consequently, the conveyor 14 may be translated in the direction 90 while maintaining a desired distance from the air cart 12, thereby facilitating alignment of the conveyor 14 with a successive storage compartment opening. Because the conveyor 14 may be positioned to successively fill each storage compartment 16 via adjustment of a single actuator, the duration associated with filling the air cart 12 with product may be substantially reduced, as compared to configurations that employ independently controllable inner and outer arms.

Figure 4:
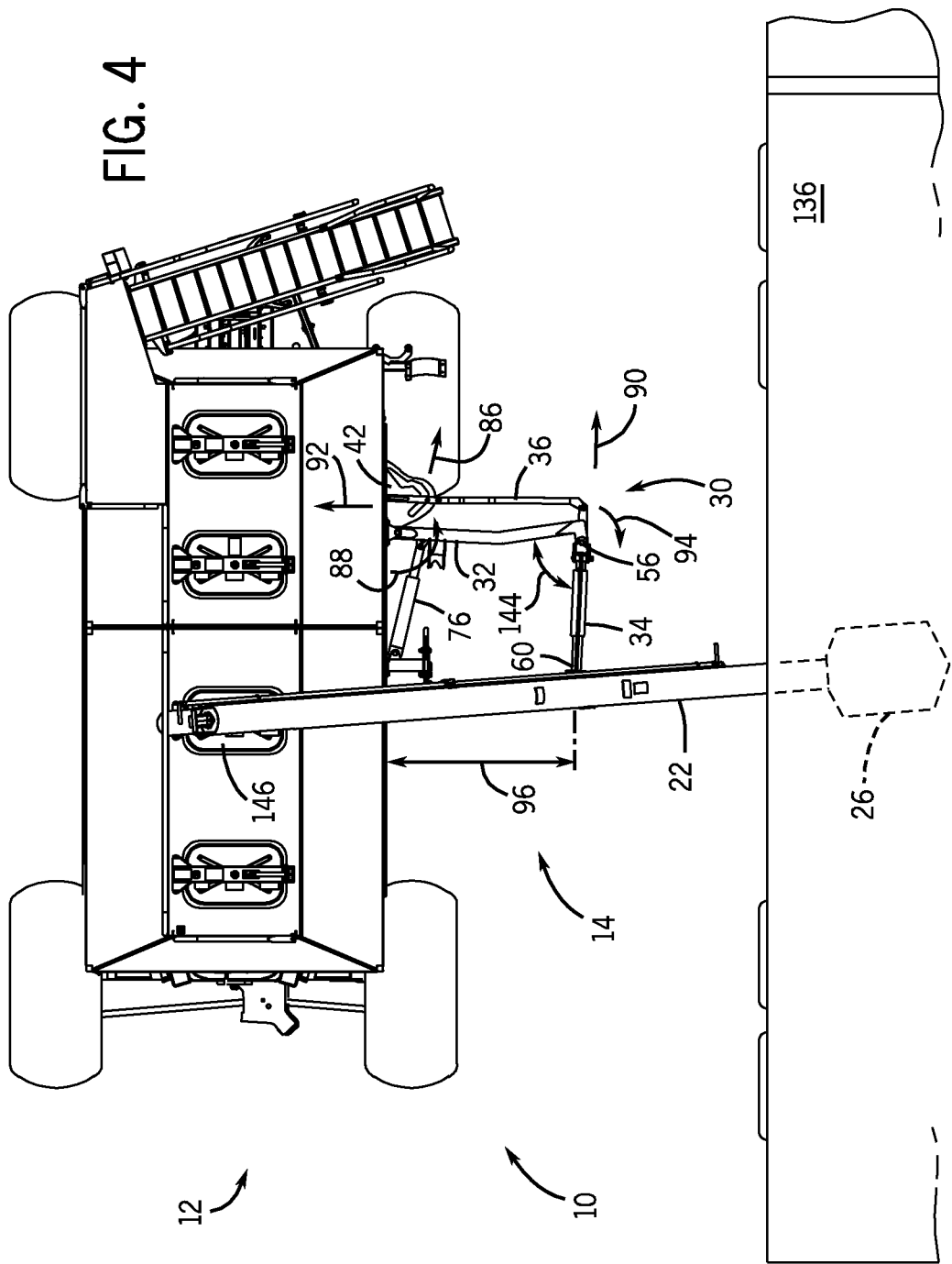
FIG. 4 is a top view of the position adjustment assembly of FIG. 2, in which the conveyor is aligned with a second storage compartment opening.

FIG. 4 is a top view of the position adjustment assembly 30, in which the conveyor 14 is aligned with a second storage compartment opening. As illustrated, the hydraulic cylinder 76 is extended relative to the position shown in FIG. 3, thereby rotating the inner arm 32 in the direction 88, and establishing an angle 144 between the inner arm 32 and the outer arm 34. In the illustrated embodiment, the angle 144 is less than the angle 138 shown in FIG. 3. As a result, the second end 60 of the outer arm 34 is positioned to facilitate alignment of the conveyor 14 with a second storage compartment opening 146. In addition, the hopper 26 remains aligned with an outlet of the truck 136. Consequently, product may flow from the truck outlet to the hopper 26, through the transporting tube 22, and into the second storage compartment opening 146. Once a desired quantity of product has been delivered to the second storage compartment, the hydraulic cylinder 76 may be extended to align the conveyor 14 with a successive storage compartment opening.

Figure 5:
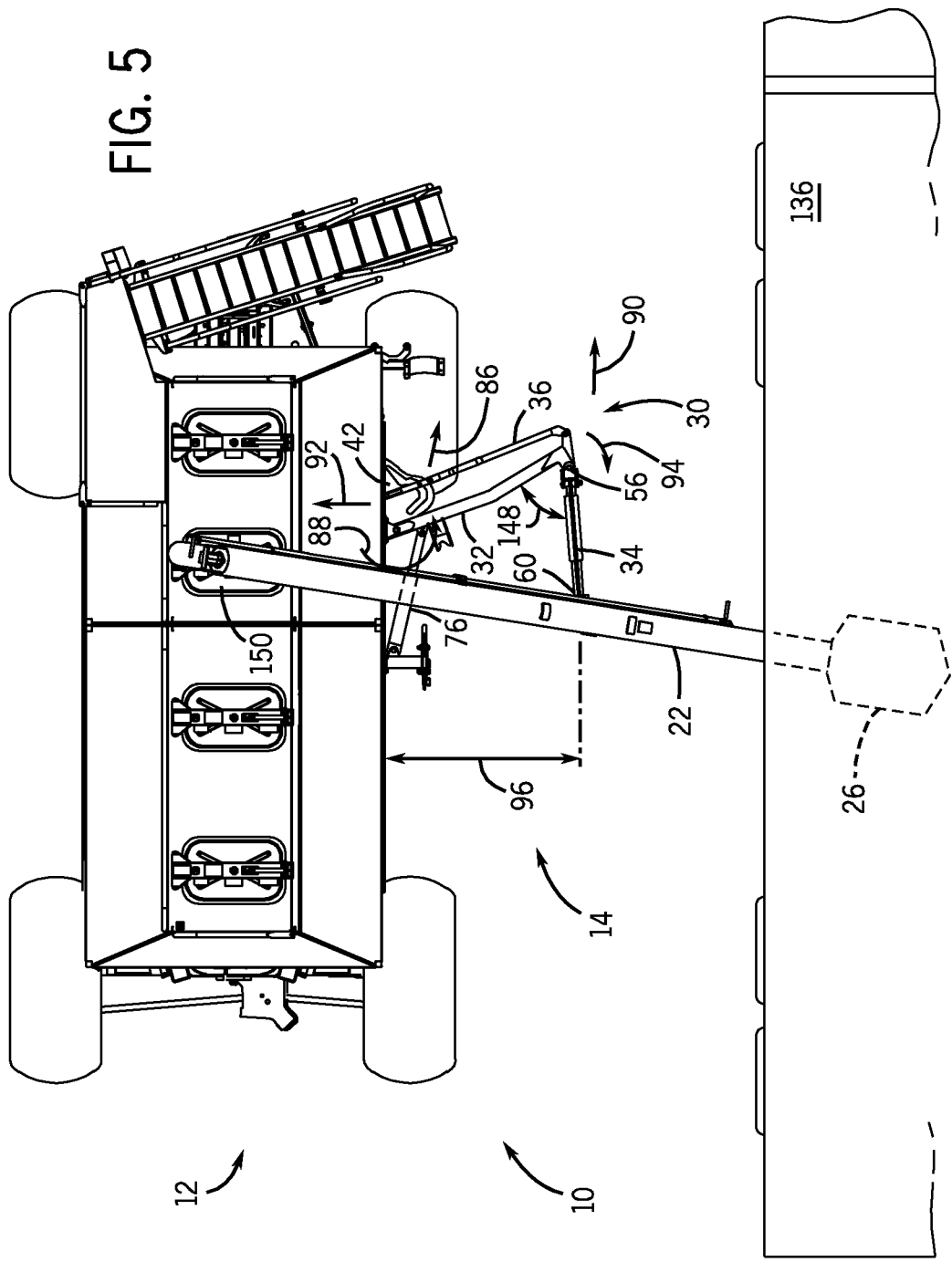
FIG. 5 is a top view of the position adjustment assembly of FIG. 2, in which the conveyor is aligned with a third storage compartment opening.

FIG. 5 is a top view of the position adjustment assembly 30, in which the conveyor 14 is aligned with a third storage compartment opening. As illustrated, the hydraulic cylinder 76 is extended relative to the position shown in FIG. 4, thereby rotating the inner arm 32 in the direction 88, and establishing an angle 148 between the inner arm 32 and the outer arm 34. In the illustrated embodiment, the angle 148 is less than the angle 144 shown in FIG. 4. As a result, the second end 60 of the outer arm 34 is positioned to facilitate alignment of the conveyor 14 with a third storage compartment opening 150. In addition, the hopper 26 remains aligned with an outlet of the truck 136. Consequently, product may flow from the truck outlet to the hopper 26, through the transporting tube 22, and into the third storage compartment opening 150. Once a desired quantity of product has been delivered to the third storage compartment, the hydraulic cylinder 76 may be extended to align the conveyor 14 with a successive storage compartment opening.

Figure 6:
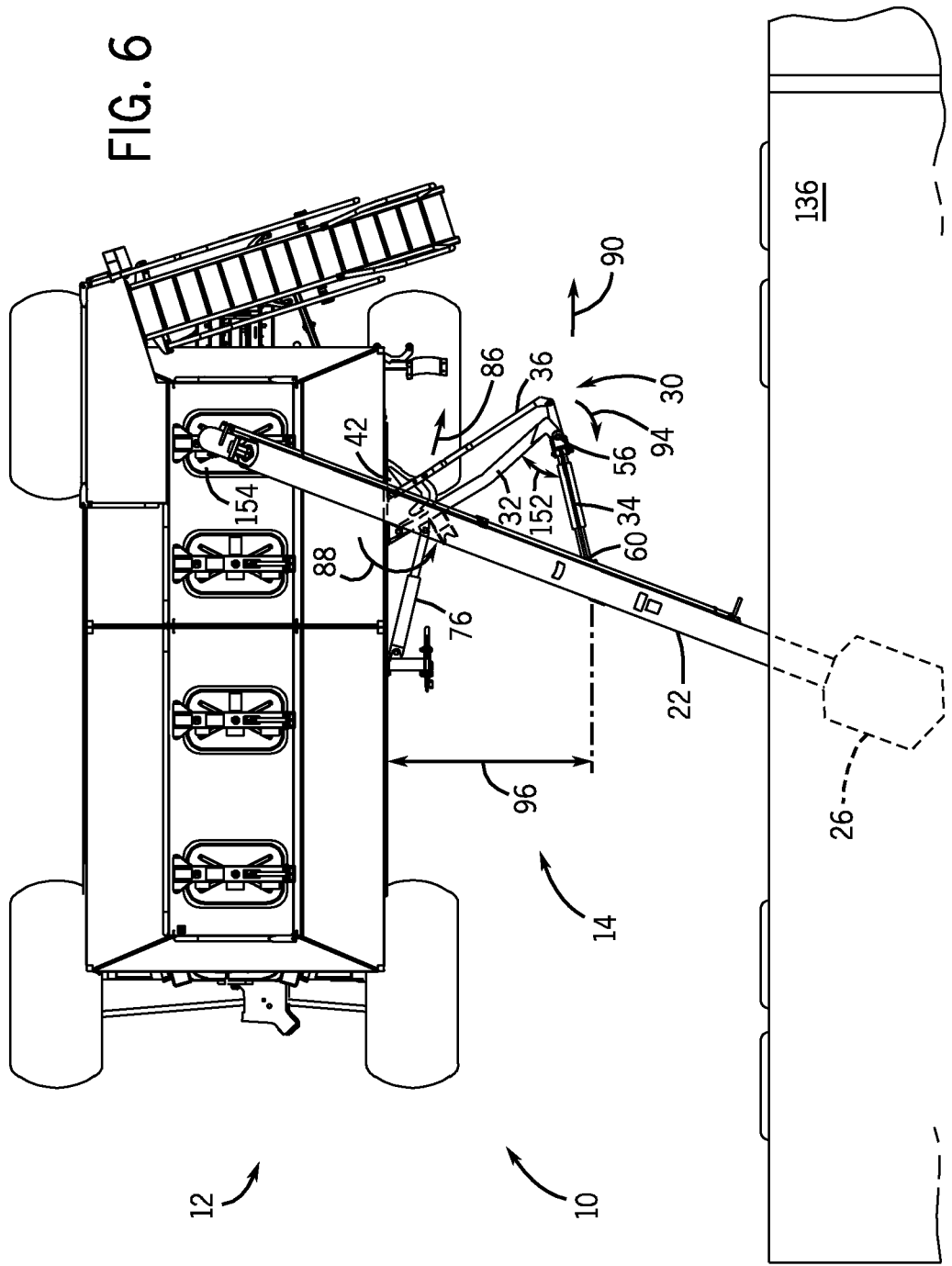
FIG. 6 is a top view of the position adjustment assembly of FIG. 2, in which the conveyor is aligned with a fourth storage compartment opening.

FIG. 6 is a top view of the position adjustment assembly 30, in which the conveyor 14 is aligned with a fourth storage compartment opening. As illustrated, the hydraulic cylinder 76 is extended relative to the position shown in FIG. 5, thereby rotating the inner arm 32 in the direction 88, and establishing an angle 152 between the inner arm 32 and the outer arm 34. In the illustrated embodiment, the angle 152 is less than the angle 148 shown in FIG. 5. As a result, the second end 60 of the outer arm 34 is positioned to facilitate alignment of the conveyor 14 with a fourth storage compartment opening 154. In addition, the hopper 26 remains aligned with an outlet of the truck 136. Consequently, product may flow from the truck outlet to the hopper 26, through the transporting tube 22, and into the second storage compartment opening 146. Because the position adjustment assembly 30 is configured to maintain a substantially constant distance 96 between the second end 60 of the outer arm 34 and the air cart 12, the conveyor 14 may be aligned with each storage compartment via adjustment of a single actuator, thereby substantially simplifying control of the conveyor 14.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A position adjustment assembly for an agricultural conveyor, comprising:
   an inner arm having a first end configured to rotatably couple to an agricultural storage system at a first location;
   an outer arm having a first end, a second end, and a pivot positioned between the first end and the second end, wherein a second end of the inner arm is rotatably coupled to the outer arm at the pivot, and the agricultural conveyor is configured to rotatably couple to the second end of the outer arm; and
   an intermediate link having a first end configured to rotatably couple to the agricultural storage system at a second location, longitudinally offset from the first location, wherein a second end of the intermediate link is rotatably coupled to the first end of the outer arm; wherein the outer arm comprises a first member extending, the first end of the outer arm and the pivot of the outer arm, and a second member rotatably coupled to the first member adjacent to the pivot of the outer arm, and extending to the second end of the outer arm.

2. The position adjustment assembly of claim 1, comprising an actuator configured to rotate the inner arm relative to the agricultural storage system.

3. The position adjustment assembly of claim 2, wherein the actuator comprises a linear actuator having a first end configured to rotatably couple to the agricultural storage system at a third location, laterally offset from the first location and on an opposite side of the first location from the second location, and a second end rotatably coupled to the inner arm.

4. The position adjustment assembly of claim 3, wherein the linear actuator comprises a hydraulic cylinder.

5. The position adjustment assembly of claim 1, wherein the position adjustment assembly is configured to move the second end of the outer arm in a longitudinal direction relative to the agricultural storage system upon rotation of the inner arm relative to the agricultural storage system.

6. The position adjustment assembly of claim 5, wherein the position adjustment assembly is configured to maintain the second end of the outer arm at a substantially constant lateral distance from the agricultural storage system upon movement of the second end of the outer arm in the longitudinal direction.

7. The position adjustment assembly of claim 1, wherein a length of the inner arm is substantially equal to a length of the intermediate link.

8. The position adjustment assembly of claim 1, wherein a distance between the first location and the second location is substantially equal to a distance between the first end of the outer arm and the pivot of the outer arm.

9. The position adjustment assembly of claim 1, wherein the second member is configured to rotate about an axis substantially perpendicular to a rotational axis of the pivot of the outer arm to facilitate adjustment of a height of the agricultural conveyor.

10. A position adjustment assembly for an agricultural conveyor, comprising:
an inner arm configured to rotatably couple to an agricultural storage system;
an outer arm having a first end, a second end, and a pivot positioned between the first end and the second end, wherein the inner arm is rotatably coupled to the outer arm at the pivot, and the agricultural conveyor is configured to rotatably couple to the second end of the outer arm; and
an intermediate link rotatably coupled to the first end of the outer arm, and configured to rotatably couple to the agricultural storage system;
wherein the position adjustment assembly is configured to move the second end of the outer arm in a longitudinal direction relative to the agricultural storage system, and to maintain the second end of the outer arm at a substantially constant lateral distance from the agricultural storage system upon rotation of the inner arm relative to the agricultural storage system; wherein the outer arm comprises a first member extending between the first end the outer arm and the pivot of the outer arm, and a second member rotatably coupled to the first member adjacent to the pivot of the outer arm, and extending to the second end of the outer arm.

11. The position adjustment assembly of claim 10, comprising an actuator configured to rotate the inner arm relative to the agricultural storage system.

12. The position adjustment assembly of claim 10, wherein a first end of the inner arm is configured to rotatably couple to the agricultural storage system at a first location, and a first end of the intermediate link is configured to rotatably couple to the agricultural storage system at a second location, longitudinally offset from the first location.

13. The position adjustment assembly of claim 12, wherein a second end of the inner arm is rotatably coupled to the outer arm at the pivot, and a second end of the intermediate link is rotatably coupled to the first end of the outer arm.

14. The position adjustment assembly of claim 10, wherein a length of the inner arm is substantially equal to a length of the intermediate link.

15. A position adjustment assembly for an agricultural conveyor, comprising:
an inner arm configured to rotatably couple to an agricultural storage system;
an outer arm having a first end, a second end, and a pivot positioned between the first end and the second end, wherein the inner arm is rotatably coupled to the outer arm at the pivot, and the agricultural conveyor is configured to rotatably couple to the second end of the outer arm; and
an intermediate link rotatably coupled to the first end of the outer arm, and configured to rotatably couple to the agricultural storage system;
wherein the intermediate link is configured to drive the outer arm to rotate about the pivot in a first direction upon rotation of the inner arm relative to the agricultural storage system in a second direction, opposite the first direction, such that a lateral distance between the second end of the outer arm and the agricultural storage system remains substantially constant; wherein the outer arm comprises a first member extending between the first end of the outer arm and the pivot of the outer arm, and a second member rotatably coupled to the first member adjacent to the pivot of the outer arm, and extending to the second end of the outer arm.

16. The position adjustment assembly of claim 15, comprising a linear actuator configured to rotate the inner arm relative to the agricultural storage system.

17. The position adjustment assembly of claim 16, wherein the linear actuator comprises a hydraulic cylinder.

18. The position adjustment assembly of claim 15, wherein a first end of the inner arm is configured to rotatably couple to the agricultural storage system at a first location, a second end of the inner arm is rotatably coupled to the outer arm at the pivot, a first end of the intermediate link is configured to rotatably couple to the agricultural storage system at a second location, longitudinally offset from the first location, and a second end of the intermediate link is rotatably coupled to the first end of the outer arm.

19. The position adjustment assembly of claim 15, wherein the position adjustment assembly is configured to move the second end of the outer arm in a longitudinal direction relative to the agricultural storage system upon rotation of the inner arm relative to the agricultural storage system.

* * * * *